(12) United States Patent
Lai (10) Patent No.: US 12,330,535 B2
(45) Date of Patent: Jun. 17, 2025

(54) SOLAR ENERGY GENERATED AND WIRELESS CHARGED MOWING SYSTEM AND MOWER THEREOF

(71) Applicant: National Chung Hsing University, Taichung (TW)

(72) Inventor: Ching-Ming Lai, Taichung (TW)

(73) Assignee: NATIONAL CHUNG HSING UNIVERSITY, Taichung (TW)

( * ) Notice: Subject to any disclaimer, the term of this patent is extended or adjusted under 35 U.S.C. 154(b) by 360 days.

(21) Appl. No.: 18/106,759

(22) Filed: Feb. 7, 2023

(65) Prior Publication Data

US 2023/0249557 A1 Aug. 10, 2023

(30) Foreign Application Priority Data

Feb. 8, 2022 (TW) .................................. 111104588

(51) Int. Cl.
*B60L 8/00* (2006.01)
*A01D 34/00* (2006.01)
(Continued)

(52) U.S. Cl.
CPC ............ *B60L 8/003* (2013.01); *A01D 34/008* (2013.01); *A01D 34/828* (2013.01);
(Continued)

(58) Field of Classification Search
CPC ...... B60L 8/003; B60L 53/126; A01D 34/008
See application file for complete search history.

(56) References Cited

U.S. PATENT DOCUMENTS 7,417,731 B1 * 8/2008 Masten ..................... G01J 3/28
356/328
9,655,356 B1 * 5/2017 Lytle, Jr. ................ A01M 17/00
(Continued)

FOREIGN PATENT DOCUMENTS

| CN | 107567825 A | 1/2018 |
|---|---|---|
| CN | 208095202 U | 11/2018 |
| TW | M541192 U | 5/2017 |

OTHER PUBLICATIONS

Taiwanese Search Report, issued in Priority Application No. 111104588, dated Jun. 7, 2022.

*Primary Examiner* — Jeffrey J Restifo
(74) *Attorney, Agent, or Firm* — Birch, Stewart, Kolasch & Birch, LLP (57) ABSTRACT

A solar energy generated and wirelessly charged mowing system includes a mower and a wireless transmitting device. The mower includes a frame including a driving seat and a wheel set, an electrical driving device connected to the wheel set, an operating device adapted to be operated by a driver, a trimmer, an energy storage device, a solar energy converting device, a wireless receiving device, and a controlling device. The trimmer mows while the frame is moving. The energy storage device includes a rechargeable battery. The solar energy converting device has a solar panel for receiving and converting a solar energy to a first electricity. The wireless receiving device receives and converts a wireless charging energy of the wireless transmitting device to a second electricity. The first electricity and the second electricity charge the rechargeable battery. The controlling device controls the electrical driving device to drive the frame to move.

10 Claims, 6 Drawing Sheets

(51) Int. Cl.
   *A01D 34/82*   (2006.01)
   *A01D 75/18*   (2006.01)
   *B60L 53/126*  (2019.01)
   *G05D 1/00*    (2006.01)
   *A01D 101/00*  (2006.01)

(52) U.S. Cl.
   CPC .......... *A01D 75/185* (2013.01); *B60L 53/126* (2019.02); *G05D 1/0246* (2013.01); *A01D 2101/00* (2013.01); *B60L 2200/40* (2013.01); *B60Y 2400/301* (2013.01)

(56) References Cited

U.S. PATENT DOCUMENTS

| | | | | |
|---|---|---|---|---|
| 10,029,551 B2 * | 7/2018 | Ito | ..................... | H01M 10/6551 |
| 10,967,752 B2 * | 4/2021 | Liu | ..................... | G05D 1/0278 |
| 11,161,422 B2 * | 11/2021 | Andriolo | ................ | H02J 50/10 |
| 11,256,255 B2 * | 2/2022 | He | ...................... | G05D 1/0225 |
| 11,701,972 B1 * | 7/2023 | Chrysanthakopoulos | ................... | A01B 79/005 |
| | | | | 701/22 |
| 11,811,228 B2 * | 11/2023 | Abe | .......................... | H02J 7/35 |
| 12,029,691 B2 * | 7/2024 | Shizukuishi | ............ | B60L 50/75 |
| 12,044,056 B2 * | 7/2024 | Frick | ..................... | G05D 1/0212 |
| 12,079,002 B2 * | 9/2024 | Yamamura | ............. | G05D 1/249 |
| 12,197,227 B2 * | 1/2025 | Porter | .................... | G05D 1/249 |
| 2023/0182580 A1 * | 6/2023 | Cronin | ................... | H02J 7/345 |
| | | | | 307/10.1 |
| 2023/0249557 A1 * | 8/2023 | Lai | ...................... | G05D 1/0225 |
| | | | | 180/65.1 |
| 2023/0278651 A1 * | 9/2023 | Genter | .................... | B60L 58/14 |
| | | | | 180/14.1 |
| 2024/0238995 A1 * | 7/2024 | Chen | ..................... | G05D 1/246 |
| 2024/0248484 A1 * | 7/2024 | Frick | ..................... | G01C 21/005 |
| 2024/0300342 A1 * | 9/2024 | Sam | ........................ | H02S 40/22 |
| 2024/0351453 A1 * | 10/2024 | Wertz | ..................... | B60K 6/28 |
| 2024/0373782 A1 * | 11/2024 | Roos | ...................... | A01D 34/008 |
| 2024/0423122 A1 * | 12/2024 | Kataoka | ................ | A01D 34/64 |

* cited by examiner

SOLAR ENERGY GENERATED AND WIRELESS CHARGED MOWING SYSTEM AND MOWER THEREOF

BACKGROUND OF THE INVENTION

Technical Field

The present invention relates generally to a mower, and more particularly to a solar energy generated and wireless charged mowing system and a mower thereof.

Description of Related Art

In a field for agriculture, gardening, and animal husbandry, weed control is very important. A weed in the field competes with a crop for water, nutrients, and carbon dioxide in soils and light, reducing a growth of the crop. In recent years, sod culture, which does not apply a herbicide, has become a consent in food and agricultural education. Sod culture is to reserve a turf (or a groundcover) to keep water and nutrients in soil, improving the soil environment and increasing soil organic matters for example. However, in order to prevent affecting the normal growth and the harvest of the crop and green the environment as well, a field where sod culture is applied requires mowing frequently, regularly, or upon the required demand to maintain a population of good species of grass and a suitable height of grass.

A backpack brush cutter or a walk mower is generally applied for mowing. However, this conventional and manual mowing method is time-consuming, labor-consuming, and not economically efficient, causing a huge burden to agriculture, gardening, animal husbandry, or orchard management. Manual mowers in the market are mainly powered by an engine, wherein the engine emits exhaust gas and is noisy and inconducive to saving energy and carbon reduction, causing undesirable influences to the environment and a human body upon using for a long time.

Although there are riding-type mowers in the market suitable for a field having a large area to increase the mowing efficiency, the riding-type mowers are still powered by an engine, and the air pollution, the noise, and the vibration caused by the engine during operating are a problem needed to be solved in the industry.

BRIEF SUMMARY OF THE INVENTION

In view of the above, the primary objective of the present invention is to provide a solar energy generated and wireless charged mowing system and a mower thereof, wherein the mower could be electrically powered, and the solar energy and a wireless charging energy could be converted to an electricity of a rechargeable battery, and the rechargeable battery serves as an electricity source.

Another primary objective of the present invention is to provide a solar energy generated and wireless charged mowing system and a mower thereof, which could be manually or automatically operated.

The present invention provides a mower which could be charged wirelessly and through a solar energy, including a frame, an electrical driving device, an operating device, a trimmer, an energy storage device, a solar energy converting device, a wireless receiving device, and a controlling device, wherein the frame includes a driving seat and a wheel set. The driving seat is adapted to be sat by a driver. The electrical driving device is disposed on the frame, and is connected to the wheel set, and is adapted to drive the wheel set to drive the frame to move. The operating device is disposed on the frame and is adapted to be operated by the driver to make the electrical driving device drive the frame move. The trimmer is disposed on a bottom of the frame and is adapted to mow while the frame is moving. The energy storage device is electrically connected to the electrical driving device and the mower, and includes a rechargeable battery adapted to provide an electricity that the electrical driving device and the trimmer require. The solar energy converting device is disposed on the frame, is electrically connected to the energy storage device, and is adapted to receive and convert the solar energy to a first electricity for charging the rechargeable battery of the energy storage device. The wireless receiving device is disposed on the frame, and is electrically connected to the energy storage device, and is adapted to receive and convert a wireless charging energy to a second electricity for charging the rechargeable battery of the energy storage device. The controlling device is disposed on the frame, is electrically connected to the electrical driving device, and is adapted to control the electrical driving device to drive the frame to move along a predetermined route when the operating device is not operated by the driver, thereby the mower could automatically move and increasing the mowing efficiency.

The present invention further provides a mowing system, which could be solar energy generated and wireless charged, applied to a field, including the aforementioned mower and at least one wireless transmitting device disposed in the field for receiving and converting an electricity to the wireless charging energy.

With the aforementioned design, the mower could receive the solar energy and the wireless charging energy for charging and allow the driver to drive manually, and could smartly and automatically mow when not being manually driven, fulfilling the purpose of charging through multiple energy sources and mowing automatically.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
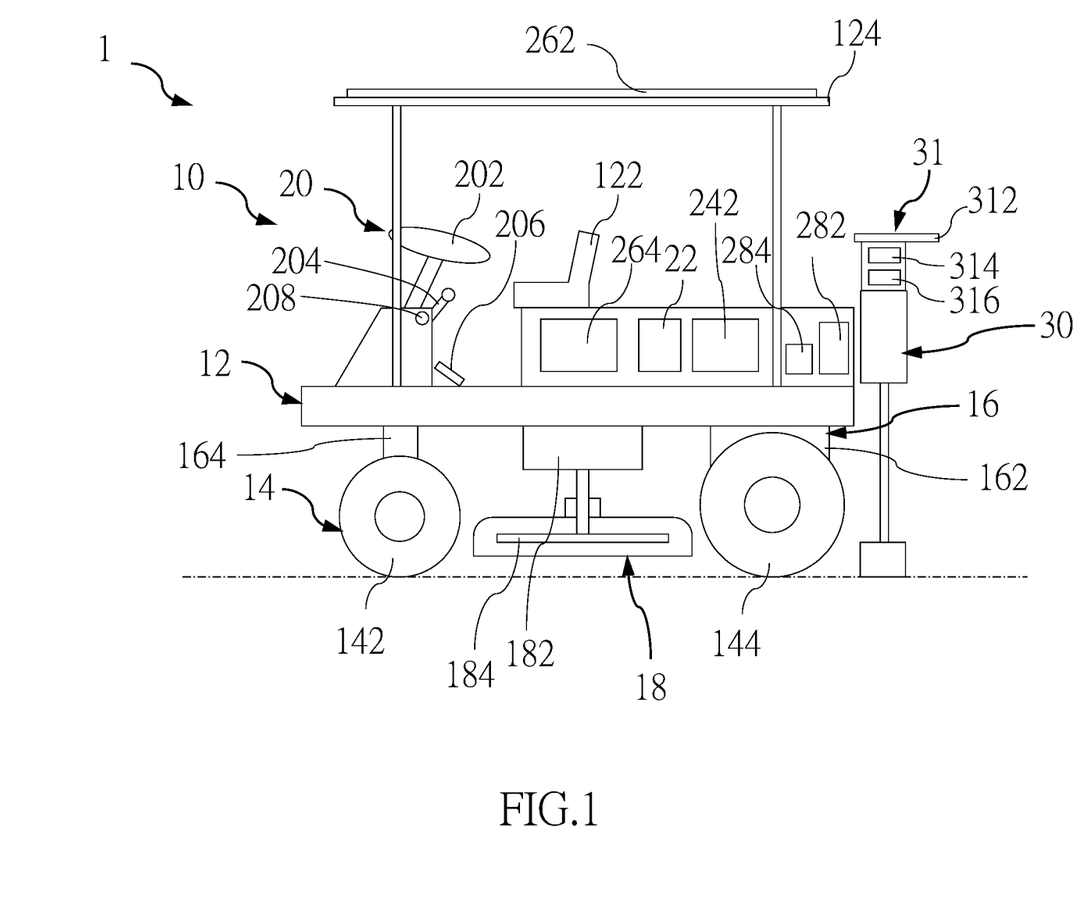
FIG. 1 is a schematic view showing the mowing system according to a first embodiment of the present invention.
Figure 2:
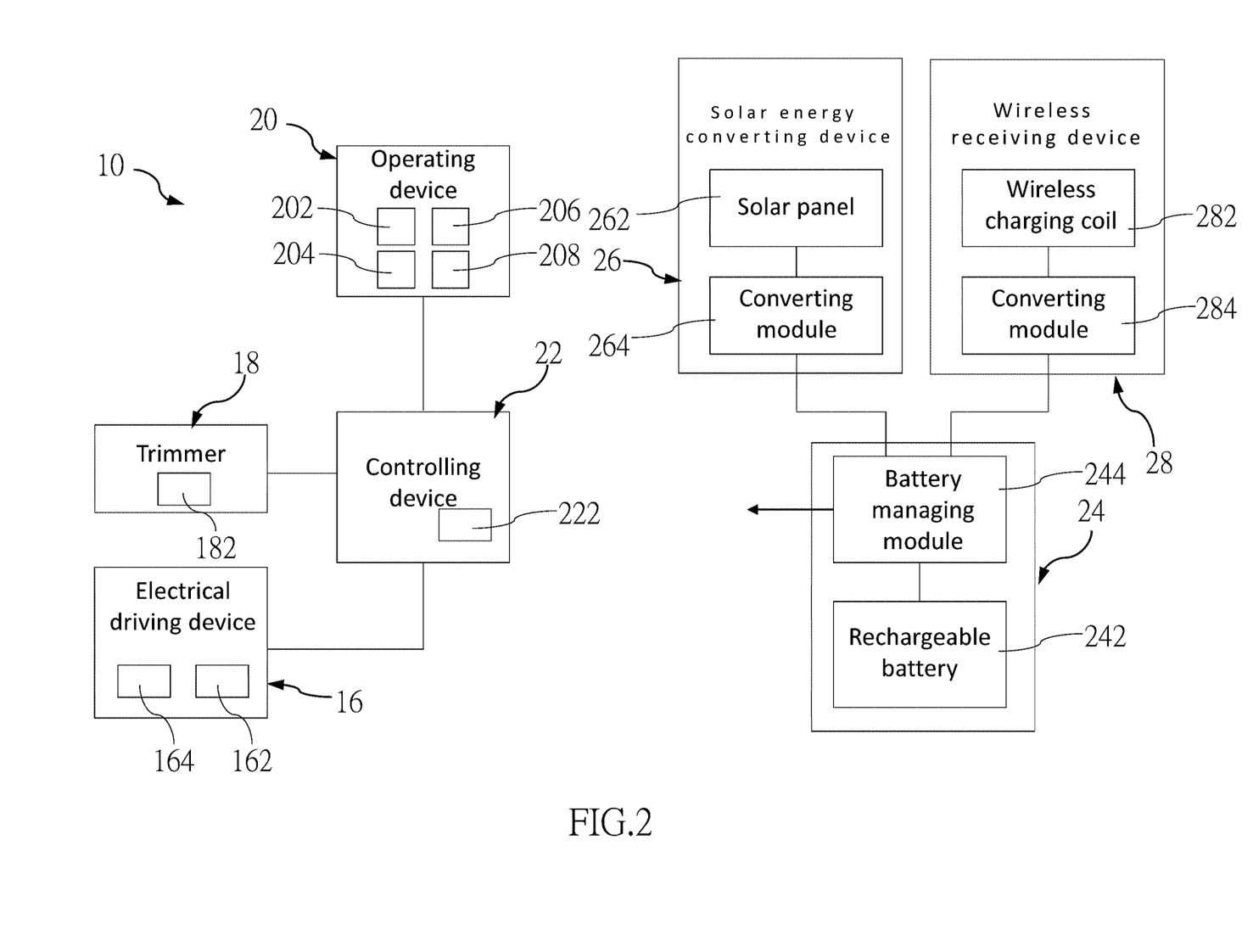
FIG. 2 is a block diagram of the mower according to the first embodiment of the present invention.
Figure 3:
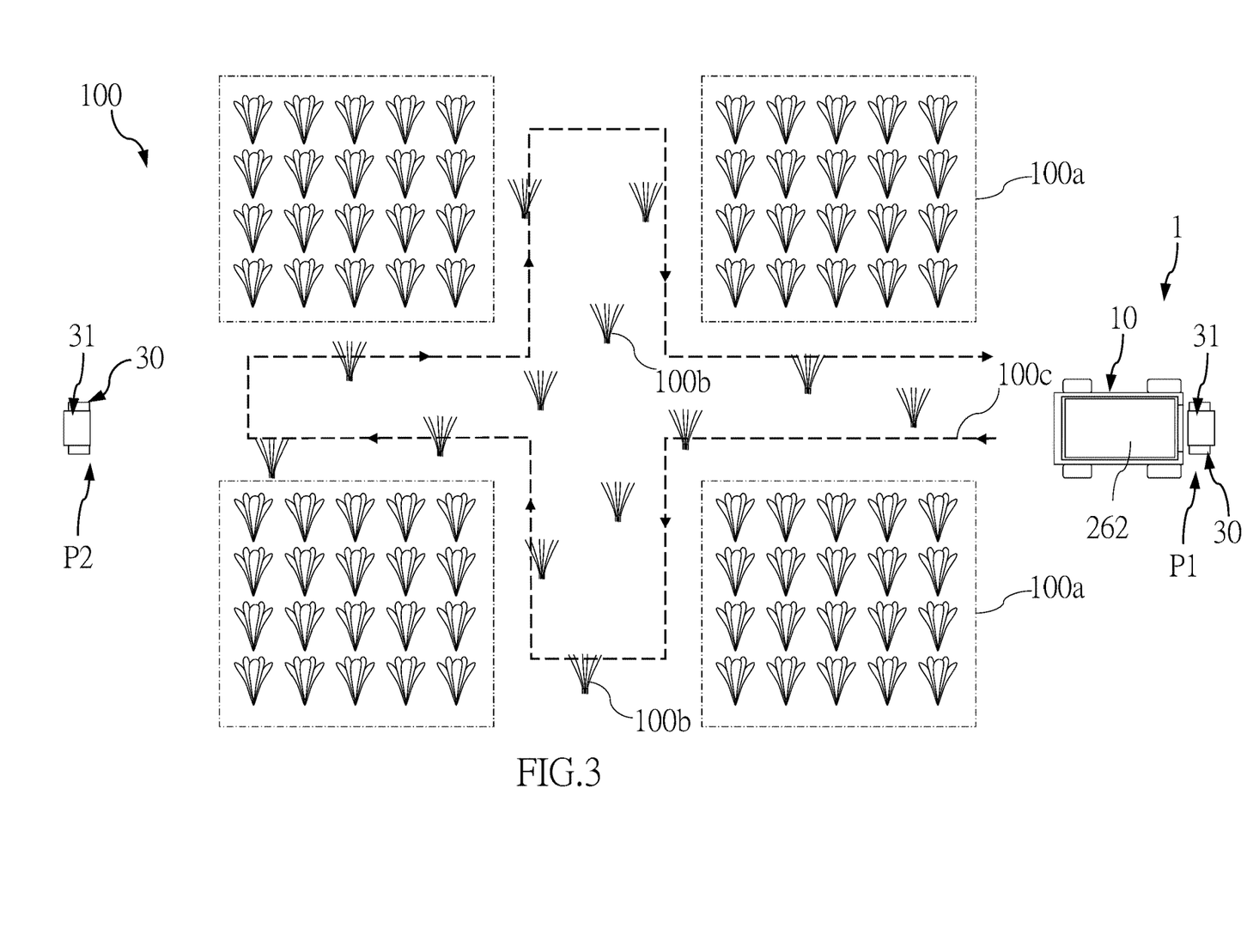
FIG. 3 is a schematic view showing the mowing system and the field according to the first embodiment of the present invention.

A mowing system 1 which could be solar energy generated and wirelessly charged according to a first embodiment of the present invention is illustrated in FIG. 1 to FIG. 3 and is applied to a field 100, and includes a mower 10 and at least one wireless transmitting device 30.

The mower 10 could be charged wirelessly and through a solar energy, and is moved in the field 100 to mow a plurality of weeds 100b. The mower 10 includes a frame 12, an electrical driving device 16, a trimmer 18, an operating device 20, a controlling device 22, an energy storage device 24, a solar energy converting device 26, and a wireless receiving device 28.

The frame 12 includes a driving seat 122 and a wheel set 14, wherein the driving seat 122 is for a driver to sit, and the wheel set 14 includes two front wheels 142 and two rear wheels 144 and is adapted to be driven to move the frame 12.

The electrical driving device 16 is disposed on the frame 12 and is connected to the wheel set 14, and is adapted to drive the wheel set 14. In the current embodiment, the electrical driving device 16 includes a driving motor 162 and a steering unit 164, wherein the driving motor 162 is operatively coupled with the two rear wheels 144, and could be controlled to rotate forwardly or reversely to drive the two rear wheels 144 to rotate forwardly or reversely, making the frame 12 move forwards or backwards. The steering unit 164 is operatively coupled with the two front wheels 142, and is adapted to drive the two front wheels 142 to turn leftwards or rightwards to change a moving direction of the frame 12.

The trimmer 18 is disposed on a bottom of the frame 12 and mows while the frame 12 is moving. In the current embodiment, the trimmer 18 includes a motor 182 and a cutting member 184, wherein the motor 182 is controlled to operate or stop, and the cutting member 184 is operatively coupled with the motor 182, thereby the motor 182 operates to drive the cutting member 184 to rotate; the cutting member 184 could be a cutting blade or a trimmer line.

The operating device 20 is disposed on the frame 12 for being manipulated by the driver to control the electrical driving device 16 to drive the frame 12 to move, and is adapted to output at least one operating signal. In the current embodiment, the at least one operating signal is plural and includes a turning signal, a forward signal, a backward signal, a driving signal, a braking signal, and a starting signal. The operating device 20 includes a steering wheel 202, a gearing module 204, at least one pedal 206, and an activating switch 208, wherein the steering wheel 202 is operated to generate the turning signal, and the gearing module 204 is operated to at least generate the forward signal and the backward signal, and the pedal 206 is operated to generate the driving signal and the braking signal. For example, the pedal 206 generates the driving signal when being stepped, and generates the braking signal when being released. In practice, the pedal 206 could include two pedals respectively generating the driving signal and the braking signal when being stepped. The activating switch 208 of the operating device 20 is operated to generate the starting signal.

The controlling device 22 is disposed on the frame 12 and is electrically connected to the electrical driving device 16. In the current embodiment, the controlling device 22 is further electrically connected to the operating device 20 and the trimmer 18 to control the electrical driving device 16 and the trimmer 18. The controlling device 22 could receive the operating signals from the operating device 20 and control the electrical driving device 16 and the trimmer 18 based on the operating signals. More specifically, the controlling device 22 could operate in either a manual mode or an automatic mode. When the driver operates the operating device 20, the controlling device 22 automatically switches to the manual mode and controls the electrical driving device 16 to drive frame 12 to move based on how the driver operates the operating device 20. For example, after receiving the starting signal of the activating switch 208 of the operating device 20, the controlling device 22 controls the motor 182 of the trimmer 18 to start and to drive the cutting member 184 to rotate. When the controlling device 22 receives the forward signal generated by the gearing module 204 and the driving signal generated by the pedal 206, the controlling device 22 controls the driving motor 162 to rotate forwardly to make the frame 12 move forwards, and controls the steering unit 164 based on the turning signal of the steering wheel 202 to make the frame 12 turn or move straight. Therefore, the driver could operate the mower 10 upon the required demand to move in the field 100 as shown in FIG. 3 to mow, such as to mow the weeds 100b in a region outside a plurality of crop regions 100a, wherein the field 100 could be a field requiring mowing, such as a farm or a garden.

In an embodiment, the operating device 20 could be directly and electrically connected to the electrical driving device 16 and the trimmer 18 to directly control the electrical driving device 16 and the trimmer 18.

In an embodiment, the motor 182 of the trimmer 18 could be operatively coupled with the electrical driving device 16, i.e., when the driving motor 162 is operating, the motor 182 of the trimmer 18 is driven to operate to drive the cutting member 184 to mow; when the driving motor 162 stops, the motor 182 of the trimmer 18 stops correspondingly and the cutting member 184 stops mowing.

When the operating device 20 is not operated by the driver, the controlling device 22 automatically switches to the automatic mode, wherein in the automatic mode, the controlling device 22 controls the electrical driving device 16 to drive the frame 12 to move along a predetermined route 100c (as shown in FIG. 3) in the field 100, and controls the motor 182 of the trimmer 18 to operate, making the cutting member 184 mow the weeds 100b. In the current embodiment, the controlling device 22 includes a memory unit 222 storing a map information of the field 100, wherein the map information includes a route information and a plurality of crop region information; the route information corresponds to the predetermined route 100c, and the plurality of crop region information correspond to a position of the crop regions 100a. The controlling device 22 controls the electrical driving device 16 to make the frame 12 move along the predetermined route 100c in the field 100 and avoid the crop regions 100a based on the route information. In the automatic mode, when the controlling device 22 receives any one of the operating signals, the controlling device 22 automatically switches to the manual mode and thereby the driver could obtain an operating authority of the mower 10 upon the required demand.

In the current embodiment, a predetermined time could be set in the memory unit 222 of the controlling device 22, wherein when the controlling device 22 in the manual mode does not receive any one of the operating signals during the predetermined time, which indicates that the driver is not operating the operating device 20, the controlling device 22 automatically switches to the automatic mode after the predetermined time.

The energy storage device 24 is electrically connected to the electrical driving device 16 and the mower 10. In the current embodiment, the energy storage device 24 is further electrically connected to the operating device 20 and the controlling device 22. The energy storage device 24 includes a rechargeable battery 242 and a battery managing module 244, wherein the rechargeable battery 242 of the energy storage device 24 is electrically connected to the battery managing module 244. The battery managing module 244 is adapted to receive a first electricity from the solar energy converting device 26 and a second electricity from the wireless receiving device 28, and to convert the first electricity and/or the second electricity to a charging electricity for charging the rechargeable battery 242 of the energy storage device 24. The rechargeable battery 242 of the energy storage device 24 is electrically connected to the electrical driving device 16, the trimmer 18, the operating device 20, and the controlling device 22 through the battery managing module 244 to provide an electricity that the electrical driving device 16, the trimmer 18, the operating device 20, and the controlling device 22 require. Additionally, the battery managing module 244 further detects a state of the rechargeable battery 242 of the energy storage device 24, including a battery level of the rechargeable battery 242 of the energy storage device 24, wherein an information of the state detected is sent to the controlling device 22.

The solar energy converting device 26 is disposed on the frame 12 and is electrically connected to the energy storage device 24. In the current embodiment, the solar energy converting device 26 includes a solar panel 262 and a converting module 264, wherein the solar panel 262 of the solar energy converting device 26 is disposed on a roof rack 124 of the frame 12 to receive and convert the solar energy to an electrical energy, and the converting module 264 of the solar energy converting device 26 is disposed on the frame 12 and is electrically connected to the battery managing module 244, and is adapted to convert the electrical energy outputted by the solar panel 262 of the solar energy converting device 26 to the first electricity and transmit the first electricity to the battery managing module 244 for charging the rechargeable battery 242 of the energy storage device 24.

The wireless receiving device 28 is disposed on the frame 12 and is electrically connected to the energy storage device 24. In the current embodiment, the wireless receiving device 28 includes a wireless charging coil 282 and a converting module 284, wherein the wireless charging coil 282 receives and converts an wireless charging energy to an electrical energy, and the converting module 284 of the wireless receiving device 28 is electrically connected to the battery managing module 244 and converts the electrical energy outputted by the wireless charging coil 282 to the second electricity and transmits the second electricity to the battery managing module 244 for charging the rechargeable battery 242 of the energy storage device 24. In the current embodiment, the wireless charging coil 282 is, but not limited to, disposed on a rear side of the frame 12.

As shown in FIG. 3, the at least one wireless transmitting device 30 includes a plurality of wireless transmitting devices 30 disposed in different regions of the field 100, but not limited thereto. In the current embodiment, the at least one wireless transmitting device 30 includes two wireless transmitting devices 30 as an example, wherein one of the wireless transmitting devices 30 is disposed at a starting position P1 in the field 100, and the other wireless transmitting device 30 is disposed at an intermediate position P2 in the field 100. The at least one wireless transmitting device 30 receives and converts an electricity to the wireless charging energy. In the current embodiment, each of the wireless transmitting devices 30 is a charging column standing on the field 100.

In the current embodiment, the mowing system 1 further includes at least one solar energy generating device 31, wherein the number of the at least one solar energy generating device 31 is two as an example, and each of the solar energy generating devices 31 is disposed on a top of one of the wireless transmitting devices 30 and is electrically connected to the corresponding wireless transmitting device 30, and provides the electricity that the wireless transmitting devices 30 require.

More specifically, each of the solar energy generating devices 31 includes a solar panel 312, a converting module 314, and a rechargeable battery 316, wherein the solar panel 312 of each of the solar energy generating devices 31 receives and converts a solar energy to an electrical energy. The converting module 314 of each of the solar energy generating devices 31 is electrically connected to the solar panel 312 of the corresponding solar energy generating device 31 and the rechargeable battery 316 of the corresponding solar energy generating device 31 and converts the electrical energy outputted by the solar panel 312 of the corresponding solar energy generating devices 31 to a charging electricity for charging the rechargeable battery 316 of the corresponding solar energy generating device 31, thereby storing an electricity in the rechargeable battery 316 of each of the solar energy generating devices 31 under sufficient sunlight. The rechargeable battery 316 of each of the solar energy generating devices 31 is electrically connected to one of the wireless transmitting devices 30 to output the electricity that the corresponding wireless transmitting device 30 requires.

In an embodiment, the at least one wireless transmitting device 30 could be selectively connected to the mains electricity, wherein when the electricity of the rechargeable battery 316 of each of the solar energy generating devices 31 is insufficient, the at least one wireless transmitting device 30 switches to the mains electricity to provide the required electricity, and the at least one wireless transmitting device 30 could have an AC-to-DC conversion circuit for converting the mains electricity to a direct current.

In the current embodiment, when the mower 10 moves to the starting position P1 or the intermediate position P2 and the wireless charging coil 282 faces the corresponding wireless transmitting device 30, the wireless charging coil 282 could receive and convert the wireless charging energy to the second electricity through the converting module 284 of the wireless receiving device 28 to be outputted to the energy storage device 24 for charging the rechargeable battery 242 of the energy storage device 24.

The map information stored in the memory unit 222 of the controlling device 22 further includes a position information of the wireless transmitting devices 30. When the controlling device 22 determines that the battery level of the rechargeable battery 242 of the energy storage device 24 is less than a predetermined battery level, the controlling device 22 controls the electrical driving device 16 to make the mower 10 move to the nearest wireless transmitting device 30 for charging.

Therefore, the mower 10 could be charged through the solar energy and the wireless charging energy; when the mower 10 is away from the at least one wireless transmitting device 30, the mower 10 could be charged by the solar energy, thereby preventing a situation that the battery level of the rechargeable battery 242 of the energy storage device 24 is insufficient during moving.

Figure 4:
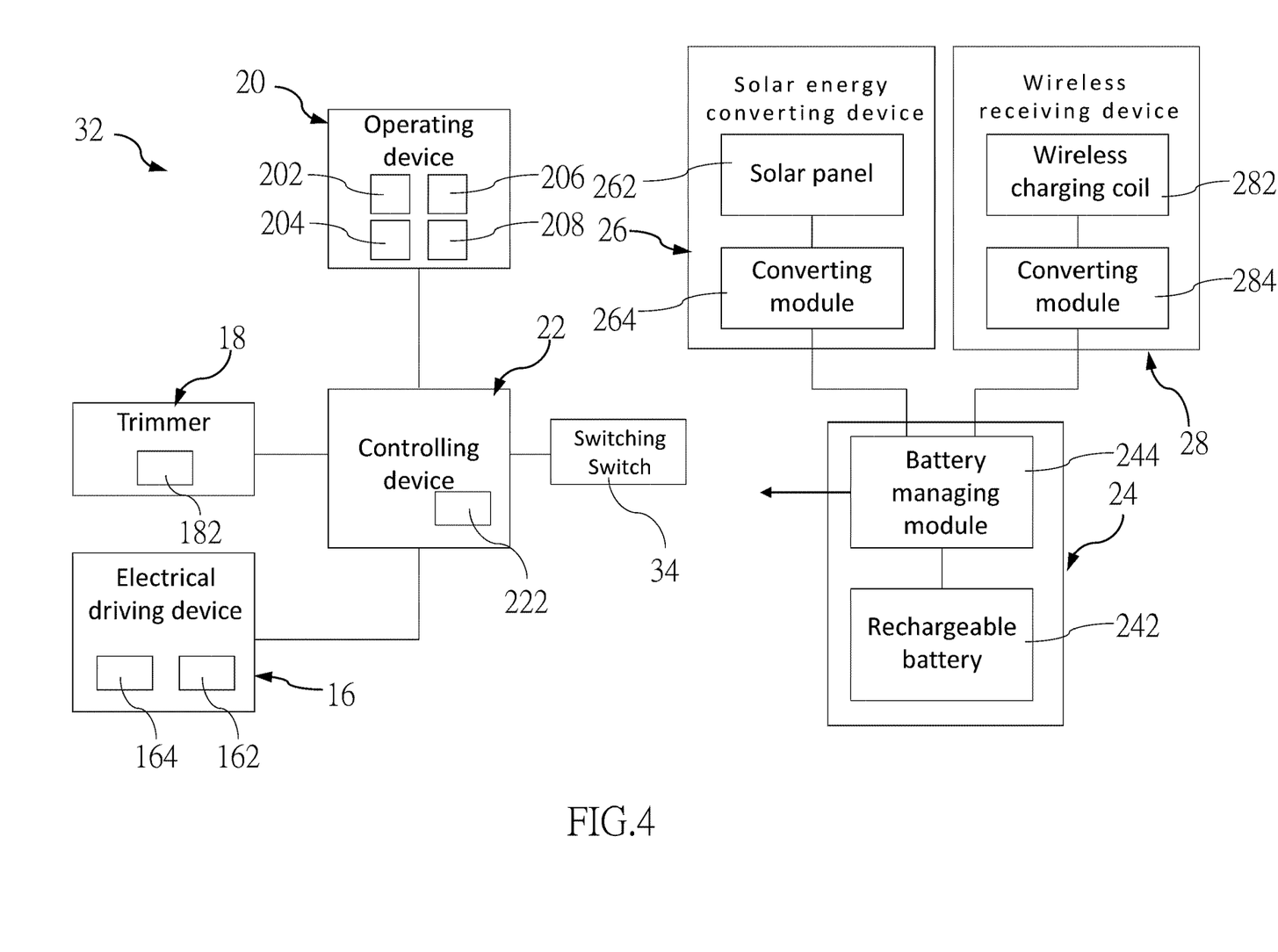
FIG. 4 is a block diagram of the mower according to a second embodiment of the present invention.

A mower 32 according to a second embodiment of the present invention is illustrated in FIG. 4 and has almost the same structure as that of the first embodiment, except that the controlling device 22 is connected to a switching switch 34 for being operated by the driver to switch between a first state and a second state, wherein when the switching switch 34 of the mower 32 is in the first state, the controlling device 22 operates in the manual mode; when the switching switch 34 of the mower 32 is in the second state, the controlling device 22 operates in the automatic mode; the driver could independently set the manual mode or the automatic mode through switching the switching switch 34 of the mower 32.

Figure 5:
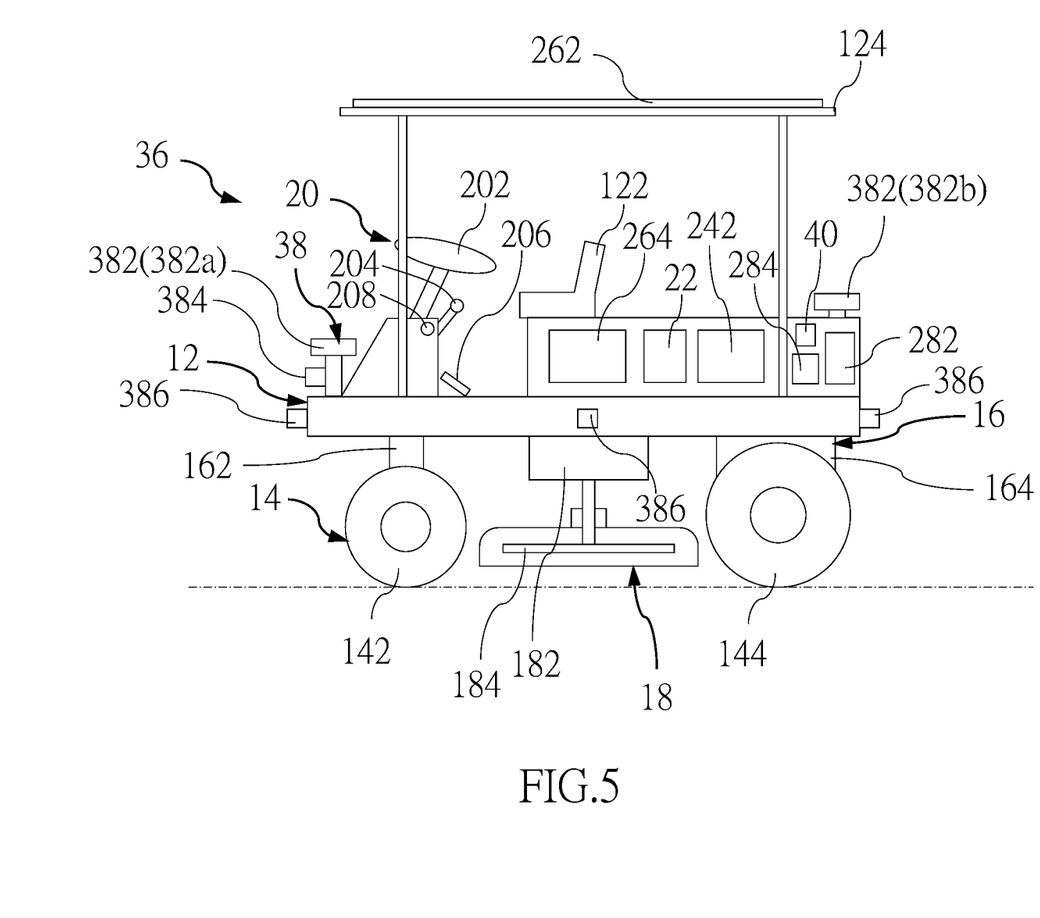
FIG. 5 is a schematic view showing the mower according to a third embodiment of the present invention.
Figure 6:
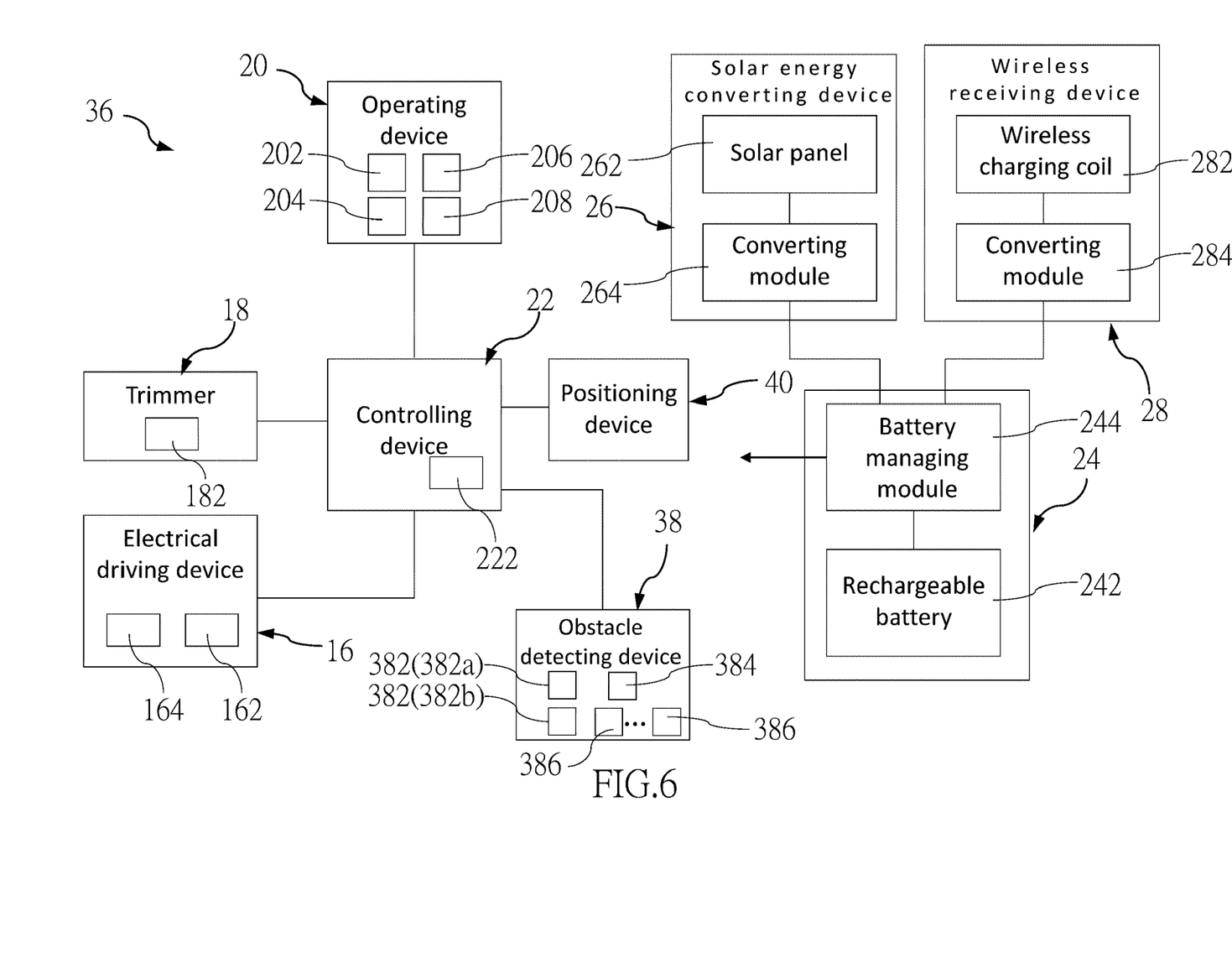
FIG. 6 is a block diagram of the mower according to the third embodiment of the present invention.

A mower 36 according to a third embodiment of the present invention is illustrated in FIG. 5 and FIG. 6 and further includes an obstacle detecting device 38 and a positioning device 40 respectively and electrically connected to the controlling device 22 based on the structure of the first embodiment, wherein the obstacle detecting device 38 is disposed on the frame 12 and is adapted to detect an obstacle in a surrounding of the frame 12. The positioning device 40 is adapted to receive a positioning signal. The controlling device 22 generates the predetermined route 100c based on the positioning signal and a result detected by the obstacle detecting device 38. In the current embodiment, the obstacle detecting device 38 includes at least one camera module 382, a lidar 384, and at least one ultrasonic sensor 386 to detect the obstacle in the surrounding of the frame 12 respectively through image sensing, light detection, and ultrasonic sensing, thereby the result detected could be more accurate through different detecting ways.

The positioning signal received by the positioning device 40 could be a satellite positioning signal of the Global Positioning System (GPS) and/or a positioning signal of a wireless signal, such as Wi-Fi and Bluetooth. The controlling device 22 obtains a position of the mower 36 through the positioning signal and establishes a position of the obstacle in the map information correspondingly with the result detected by the obstacle detecting device 38, and then drafts the predetermined route 100c, thereby the mower 36 could avoid the obstacle when moving along the predetermined route 100c. In the current embodiment, the lidar 384 is disposed on a front side of the frame 12, and the at least one ultrasonic sensor 386 includes a plurality of ultrasonic sensors 386 respectively disposed on the front side, the rear side, a left side, and a right side of the frame 12. In an embodiment, the obstacle detecting device 38 could be the camera module 382, the lidar 384, the at least one ultrasonic sensor 386, or a combination thereof.

The at least one camera module 382 is adapted to capture an environment image of the surrounding of the frame 12. In the current embodiment, the number of the at least one camera module 382 is two and includes a first camera module 382a and a second camera module 382b, wherein the first camera module 382a is disposed on the front side of the frame 12 and is adapted to capture an environment image of a front of the frame 12, and the second camera module 382b is disposed on the rear side of the frame 12 and is adapted to capture an environment image of a rear of the frame 12.

The memory unit 222 of the controlling device 22 stores a model of at least one target plant group, which is a group of the weeds 100b required to be removed. In the current embodiment, the at least one target plant group includes a plurality of target plant groups, and the models of the plurality of target plant groups are established in advance through training by an algorithm, wherein the algorithm could be YOLOv4, R-CNN, Fast R-CNN, Faster R-CNN, Mask R-CNN, Single Shot MultiBox Detector (SSD), etc.

When the mower 36 is moving, the controlling device 22 determines whether the at least one target plant group exists in the environment image. In the current embodiment, the controlling device 22 determines whether the environment image of the front of the frame 12 captured by the first camera module 382a fulfills features of the models based on the models of the plurality of target plant groups; if the environment image of the front of the frame 12 does not fulfill the features of the models, the plurality of target plant groups do not exist in the environment image, and the controlling device 22 controls the trimmer 18 to stop operating, thereby reducing an electricity consumed by the trimmer 18; if the environment image of the front of the frame 12 fulfills the features of the models, the controlling device 22 controls the trimmer 18 to operate, and the frame 12 passes through the plurality of target plant groups along the predetermined route 100c to mow the plurality of target plant groups.

After the frame 12 passes through the plurality of target plant groups along the predetermined route 100c, the controlling device 22 determines whether the plurality of target plant groups still exist in the environment image of the rear of the frame 12 captured by the second camera module 382b. If the plurality of target plant groups still exist in the environment image of the rear of the frame 12, the plurality of target plant groups are not successfully mowed by the trimmer 18. At that time, the controlling device 22 controls the electrical driving device 16 to make the trimmer 18 operate and to drive the frame 12 to move backwards over a predetermined distance along the predetermined route 100c to pass through the plurality of target plant groups and try again to mow the plurality of target plant groups that are not previously mowed. Afterwards, the electrical driving device 16 is controlled to drive the frame 12 to move forwards along the predetermined route 100c. Then, the controlling device 22 determines whether the plurality of target plant groups still exist in the environment image of the rear of the frame 12. If the controlling device 22 determines that the plurality of target plant groups still exist in the environment image of the rear of the frame 12, mowing is failed, and the memory unit 222 records a coordinate of the plurality of target plant groups remained, wherein the coordinate is generated based on the positioning signal received by the positioning device 40.

In an embodiment, the controlling device 22 could have a communicating module (not shown) to communicate with an external electronic device (not shown), and the coordinate and a type of the at least one target plant group are sent to the electronic device, wherein the electronic device could be a cell phone and a laptop for example, thereby a worker could go to the field 100 for mowing based on the coordinate received by the electronic device.

In the current embodiment, the mower 36 could apply the switching switch 34 of the mower 32 in the second embodiment to allow the driver to independently switch between the manual mode and the automatic mode. Additionally, the mower 32 in the second embodiment and the mower 36 in the third embodiment could be applied to the mowing system 1 in the first embodiment.

With the aforementioned design, the mower of the present invention could receive the solar energy and the wireless charging energy for charging and allow the driver to manually drive, and automatically move along the predetermined route when the driver is not driving, thereby fulfilling the purpose of charging through multiple energy sources and mowing automatically and being environmentally friendly and not causing pollutions.

It must be pointed out that the embodiments described above are only some preferred embodiments of the present invention. All equivalent structures and methods which employ the concepts disclosed in this specification and the appended claims should fall within the scope of the present invention.

What is claimed is:

1. A wirelessly charged and solar energy charged mower, comprising:
 a frame comprising a driving seat and a wheel set, wherein the driving seat is adapted to be sat by a driver;
 an electrical driving device disposed on the frame, connected to the wheel set, and adapted to drive the wheel set to drive the frame to move;
 an operating device disposed on the frame and adapted to be operated by the driver to make the electrical driving device drive the frame to move;
 a trimmer disposed on a bottom of the frame and adapted to mow while the frame is moving;
 an energy storage device electrically connected to the electrical driving device and the mower and comprising a rechargeable battery adapted to provide an electricity that the electrical driving device and the trimmer require;
 a solar energy converting device disposed on the frame and electrically connected to the energy storage device, and adapted to receive and convert the solar energy to a first electricity for charging the rechargeable battery of the energy storage device;
 a wireless receiving device disposed on the frame and electrically connected to the energy storage device, and adapted to receive and convert a wireless charging energy to a second electricity for charging the rechargeable battery of the energy storage device;
 a controlling device disposed on the frame and electrically connected to the electrical driving device, and adapted to control the electrical driving device to drive the frame to move along a predetermined route when the operating device is not operated by the driver;
 a first camera module disposed on the frame, electrically connected to the controlling device, and adapted to capture an environment image of a surrounding of the frame, wherein the controlling device determines whether at least one target plant group exists in the environment image; when the controlling device determines that the at least one target plant group exists in the environment image, the controlling device controls the trimmer to operate, and the frame passes through the at least one target plant group along the predetermined route; and
 a second camera module disposed on the frame and electrically connected to the controlling device, wherein the second camera module is disposed on a rear side of the frame and adapted to capture an environment image of a rear of the frame; the first camera module is disposed on a front side of the frame and is adapted to capture the environment image of a front of the frame; after the frame passes through the at least one target plant group along the predetermined route and the controlling device determines that the at least one target plant group exists in the environment image of the rear of the frame, the controlling device controls the electrical driving device to drive the frame to move backwards over a predetermined distance along the predetermined route to pass through the at least one target plant group, and then controls the electrical driving device to drive the frame to move forwards along the predetermined route;
 wherein after the electrical driving device drives the frame to move forwards along the predetermined route and the controlling device determines that the at least one target plant group still exists the environment image of the rear of the frame, a coordinate of the at least one target plant group is recorded.

2. The mower as claimed in claim 1, wherein when the controlling device determines that the at least one target plant group does not exist in the environment image of the front of the frame, the controlling device controls the trimmer to stop operating.

3. The mower as claimed in claim 1, further comprising a positioning device electrically connected to the controlling device and adapted to receive a positioning signal, wherein the controlling device generates the coordinate based on the positioning signal.

4. The mower as claimed in claim 1, wherein the operating device is electrically connected to the electrical driving device through the controlling device; the controlling device operates either in an automatic mode or in a manual mode; when the controlling device operates in the automatic mode, the controlling device controls the electrical driving device to drive the frame to move along the predetermined route; when the controlling device operates in the manual mode, the operating device is operated by the driver to output at least one operating signal, and the controlling device controls the electrical driving device to drive the frame to move based on the at least one operating signal, and the controlling device automatically switches to the automatic mode when the controlling device does not receive the at least one operating signal after a predetermined time.

5. The mower as claimed in claim 4, wherein when the controlling device operates in the automatic mode and receives the at least one operating signal, the controlling device switches to the manual mode.

6. The mower as claimed in claim 1, further comprising a switching switch electrically connected to the controlling device and being operable to switch between a first state and a second state; wherein the operating device is electrically connected to the electrical driving device through the controlling device; when the switching switch of the mower is in the first state, the controlling device operates in a manual mode, and the operating device is operated by the driver to output at least one operating signal, and the controlling device controls the electrical driving device drive the frame to move based on the at least one operating signal; when the switching switch of the mower is in the second state, the controlling device operates in an automatic mode, and the controlling device controls the electrical driving device to drive the frame to move along the predetermined route.

7. The mower as claimed in claim 1, further comprising an obstacle detecting device and a positioning device respectively and electrically connected to the controlling device, wherein the obstacle detecting device is disposed on the frame and is adapted to detect an obstacle of the surrounding of the frame; the positioning device is adapted to receive a positioning signal; the controlling device generates the predetermined route based on the positioning signal and a result detected by the obstacle detecting device.

8. The mower as claimed in claim 7, wherein the obstacle detecting device comprises a lidar, at least one ultrasonic sensor, or a combination thereof.

9. A solar energy generated and wirelessly charged mowing system applied to a field, comprising:
 the mower as claimed in claim 1 for moving in the field; and
 at least one wireless transmitting device disposed in the field for receiving and converting an electricity to the wireless charging energy.

10. The mowing system as claimed in claim 9, further comprising a solar energy generating device electrically connected to the at least one wireless transmitting device for receiving and converting a solar energy to the electricity and outputting the electricity to the at least one wireless transmitting device.

* * * * *